March 24, 1936. B. J. ANDERSON 2,034,935
SEAT POST SUPPORTING MEMBER
Filed March 22, 1935 2 Sheets-Sheet 1
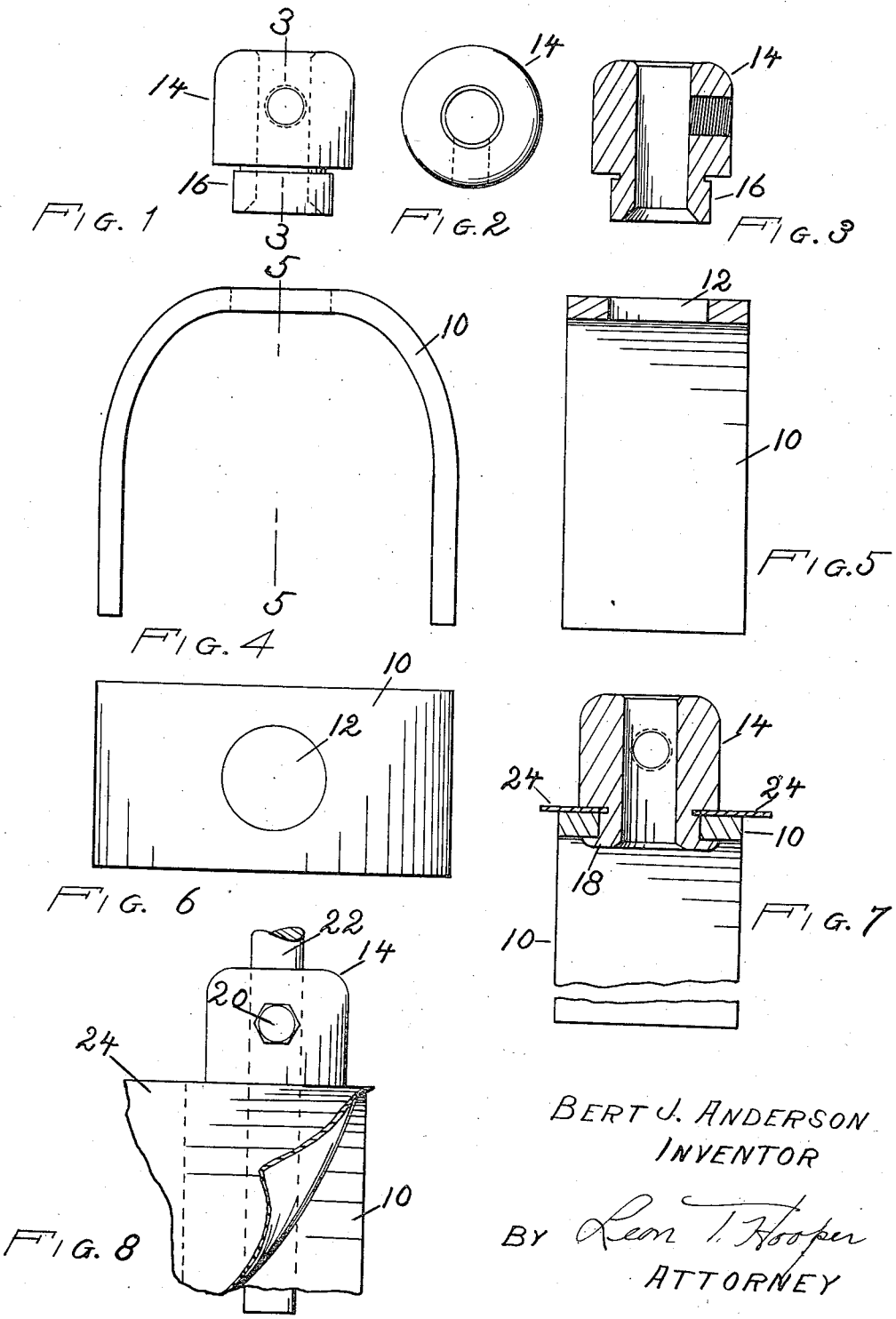
Bert J. Anderson
INVENTOR
By Leon T. Hooper
ATTORNEY March 24, 1936.  B. J. ANDERSON  2,034,935
SEAT POST SUPPORTING MEMBER
Filed March 22, 1935  2 Sheets-Sheet 2

BERT J. ANDERSON
INVENTOR

BY Leon T. Hooper
ATTORNEY

Patented Mar. 24, 1936

2,034,935

UNITED STATES PATENT OFFICE 2,034,935

SEAT POST SUPPORTING MEMBER

Bert J. Anderson, Hammond, Ind.

Application March 22, 1935, Serial No. 12,422

10 Claims. (Cl. 208—63)

This invention relates to a seat post supporting member and is adapted to be used on velocipedes having a sheet metal or hollow frame.

One of the principal objects of advantage of the seat post supporting member of this invention resides in the fact that the lower portion of the member may be secured to the inside surface of the hollow frame.

A further object of importance resides in the fact that a portion of the sheet metal frame may be secured between the upper and lower portions of the seat post supporting member.

A further object of importance resides in the provision of means for supporting a seat post without relying on an aperture in the bottom portion of the frame.

A still further important object of advantage resides in the fact that the device is constructed of a few simple parts which may be readily assembled to form a rugged and practically indestructible device.

Additional objects of importance and advantage will be apparent from the following specification and the accompanying drawings, which show the preferred embodiment of this invention.

In the drawings:

Figure 1 is a side elevation of the top portion of the seat post supporting member of this invention.

Figure 2 is a top plan view thereof.

Figure 3 is an upright sectional view taken on the line 3—3 of Figure 1.

Figure 4 is a front elevation of the lower portion of the seat post supporting member.

Figure 5 is a sectional view taken on the line 5—5 of Figure 4.

Figure 6 is a top plan view of the lower portion of the member.

Figure 7 is a vertical sectional view of the assembled unit.

Figure 8 is a side elevation of the assembled unit with a portion of the sheet metal frame turned back.

As shown in the drawings:

Figure 9:
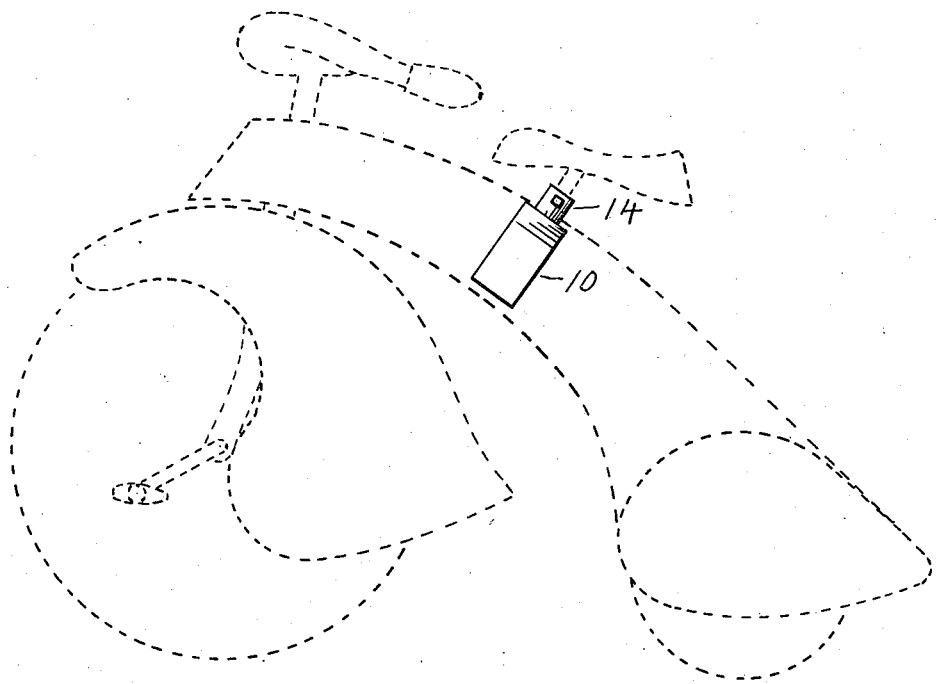
Figure 9 is a side elevation of the device in use, the velocipede being shown in dotted lines.

The reference numeral 10 indicates in a general way the U-shaped member which forms the lower portion of the device. This member is preferably formed to fit the contour of the inner surface of the frame to which it is preferably secured by spot welding. However, it will be obvious that the member may be secured to the outside of the frame and may be fastened in any suitable manner.

The member 10 is apertured, as is best shown by the reference numeral 12 in Figures 5 and 6. A ferrule 14 having a portion 16 corresponding in size and adapted to be positioned within the aperture 12 is secured to the member 10 by expanding the lower part of the ferrule, as is clearly shown by the reference numeral 18 in Figure 7.

Centrally located in the upper portion of the ferrule is a set screw 20, which is adapted to secure a seat post 22 in any desired position.

Where the device is used in conjunction with a sheet metal frame, a portion of the frame 24 is secured between the ferrule 14 and the U-shaped member 10, as is clearly shown in Figure 7.

In assembling the device of this invention for use in association with a sheet metal frame, the U-shaped member is positioned within the frame and is preferably spot welded thereto. The lower portion of the ferrule is then inserted through an aperture in the frame and the aperture 12 in the U-shaped member, where it is secured by expanding or heading the end thereof.

It will be apparent from the foregoing that herein is provided a seat post supporting member which is sturdy and strong, and which may be economically manufactured.

Moreover, because of its unique design, it may be used in conjunction with a sheet metal frame which has no floor member.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A seat post supporting member comprising an apertured U-shaped member adapted to be invertedly positioned and secured within a velocipede frame, a ferrule secured to the transverse portion of said U-shaped member and extending thereabove, and means associated with said ferrule for clamping a seat post in operable position.

2. A seat post supporting member having a portion adapted to be secured to the inside surface of a sheet metal velocipede frame and a portion extending above said frame, and means associated with the portion above the frame for securing a seat post in operable position.

3. A seat post supporting member comprising an apertured U-shaped member and a ferrule positioned in said aperture and secured to said U-shaped member, the upper portion of said ferrule being of greater diameter than the lower portion thereof.

4. A seat post supporting member comprising an apertured U-shaped member, a ferrule positioned within the aperture of said member, means for preventing the ferrule from moving downwardly into said aperture and means for preventing the withdrawal of said ferrule from the aperture.

5. A seat post supporting member comprising an apertured U-shaped member, a ferrule positioned within the aperture of said member, means for preventing the ferrule from moving downwardly into said aperture, means for preventing the withdrawal of said ferrule from the aperture, and means for securing a seat post within said ferrule.

6. In a seat post securing member, an apertured U-shaped member, and a ferrule, the lower portion of said ferrule being restricted and positioned within said aperture, and the lower edge of said ferrule being crimped outwardly and upwardly against the under surface of said U-shaped member.

7. A seat post supporting member comprising a tubular member and a U-shaped member joined together, said U-shaped member being adapted to be secured to the inner surface of a velocipede frame and said tubular member extending outwardly of said frame.

8. In a seat post securing member for use with a sheet metal open bottom velocipede frame, a ferrule, a member secured to said ferrule and having portions adapted to be formed to fit against and be secured to opposing sides of said frame, and means associated with said ferrule for securing a seat post in place.

9. A seat post supporting member for use with a sheet metal velocipede frame and comprising a tubular member and an apertured member joined together, said apertured member being adapted to be secured to said sheet metal frame, said tubular member extending outwardly of said frame, and means for securing a seat post within said tubular member.

10. A seat post supporting member for use with a sheet metal velocipede frame and comprising a tubular member and an apertured member joined together, said apertured member being adapted to be secured to the inner surface of said sheet metal velocipede frame, said tubular member extending outwardly of said frame, and means for securing a seat post within said tubular member.

BERT J. ANDERSON.